United States Patent [19]

Graven et al.

[11] 4,041,652

[45] Aug. 16, 1977

[54] APPARATUS FOR ENGRAVING THE SIDEWALL OF A TIRE

[75] Inventors: Andrew A. Graven, Akron; David M. Ronyak, Copley; Edward B. Bose, Stow, all of Ohio

[73] Assignee: The Goodyear Tire & Rubber Company, Akron, Ohio

[21] Appl. No.: 692,812

[22] Filed: June 4, 1976

[51] Int. Cl.² .................. B24B 19/22; B24B 17/02; B29H 21/02

[52] U.S. Cl. ........................ 51/241 R; 33/23 B; 156/116

[58] Field of Search ........... 51/241 R, 310, 311, 51/312, DIG. 23; 152/353 R, DIG. 12; 156/116; 33/23 D, 23 R, 25 D, 23 B; 35/37, 66

[56] References Cited

U.S. PATENT DOCUMENTS

| | | | |
|---|---|---|---|
| 2,656,604 | 10/1953 | Skruggs | 33/23 B |
| 3,218,208 | 11/1965 | Molen | 156/116 |
| 3,730,751 | 5/1973 | Newberger | 35/66 |
| 3,769,123 | 10/1973 | Botts et al. | 156/116 |

FOREIGN PATENT DOCUMENTS 344,931   4/1960   Switzerland .............. 33/23 R

*Primary Examiner*—Al Lawrence Smith
*Assistant Examiner*—Roscoe V. Parker
*Attorney, Agent, or Firm*—F. W. Brunner; R. S. Washburn

[57] ABSTRACT

A portable apparatus which can be used by local tire distributors to customize a tire by forming in the sidewall of the tire, personalized indicia requested by the owner of the tire. The apparatus has a support for holding the desired pattern of indicia, a stylus that is traceable on the indicia, and a small router-like engraving tool which is movable, in unison, with the stylus for grinding into the sidewall of the tire, indicia corresponding to that of the desired pattern.

20 Claims, 6 Drawing Figures

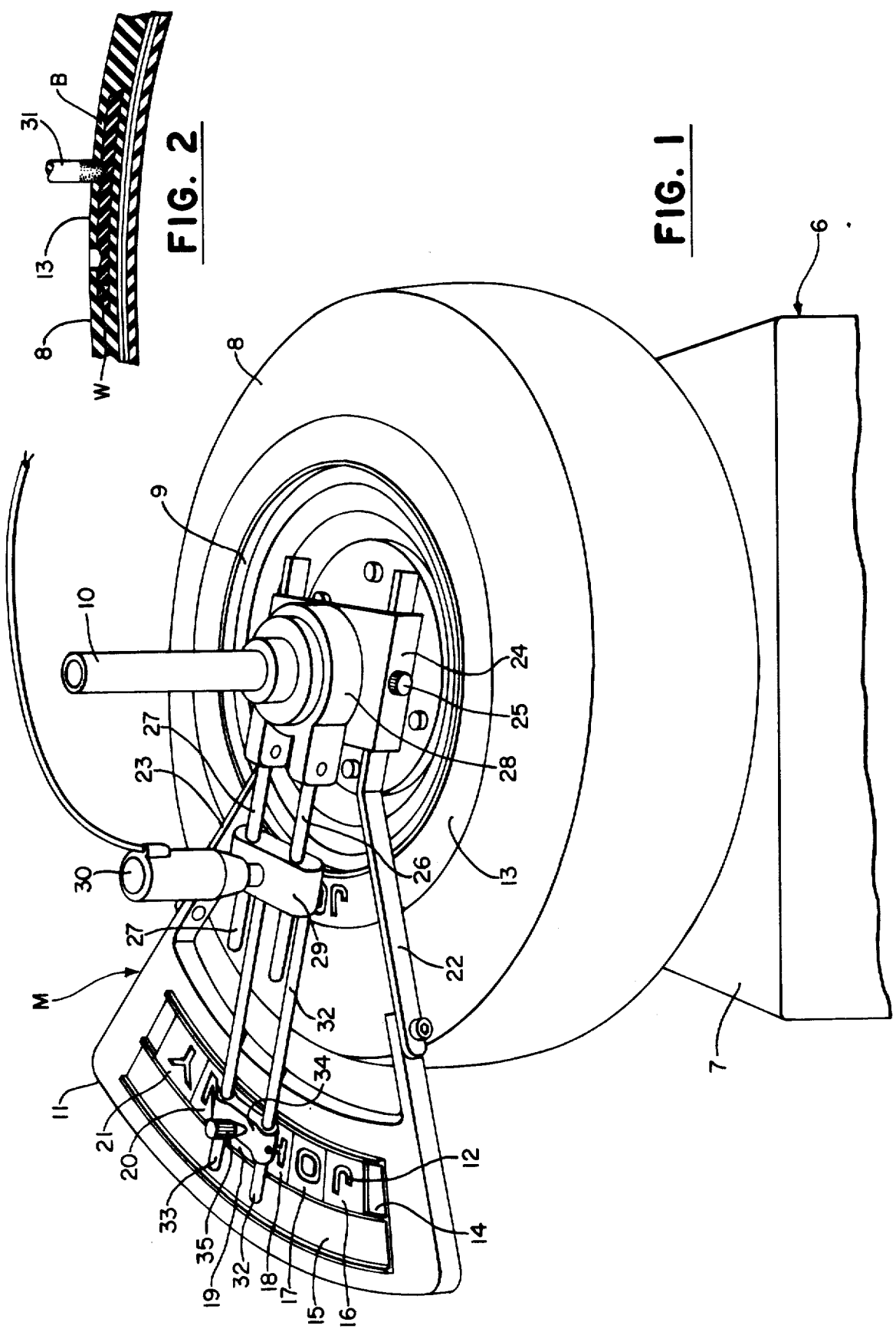

4,041,652

APPARATUS FOR ENGRAVING THE SIDEWALL OF A TIRE

BACKGROUND OF THE INVENTION

The invention is particularly well suited for individualizing or customizing tires, i.e. the formation of any desired pattern of contrastingly colored indicia in the sidewall of a tire. Presently, indicia such as letters, numerals, or ornamental designs, are molded into the sidewall of the tire, as shown and described in U.S. Pat. No. 3,769,123. A conventional, cylindrically shaped grinding wheel is then used to buff away the outer layer of black rubbery material covering the raised pattern of indicia to expose the contrastingly colored underlayer of rubbery material in which the desired pattern of indicia is also molded. This work is done at the factory where the tire is produced, and the indicia placed on a tire normally represents a trademark associated with the tire, or identifies the type and size of the tire. The owner of a tire is not free to have his or her own personal choice of indicia on the sidewall of a tire, because of the difficulty and expense of molding innumerable designs which would be requested by the consumer. The invention is directed to solving this problem by providing a portable type device which any local tire distributor can use to customize a set of tires for an owner desiring personalized contrasting indicia on the sidewalls of the tires.

Briefly stated, the invention is in a method and apparatus used in the formation of contrastingly colored indicia in the sidewall of a tire. The apparatus is utilized to grind a desired pattern of indicia into the sidewall of a tire and is provided with a support for the tire and wheel rim on which the tire is mounted and inflated. A pattern of indicia, desired to be formed in the sidewall of the tire, is mounted adjacent the tire such that each of the indicia are equally spaced from the center axis of the tire and wheel rim. A stylus for tracing the indicia of the pattern, and a tool for engraving the indicia in the sidewall, are mounted for unitary movement in radial and arcuate directions and any combination thereof, relative to the center axis of the tire and wheel rim, whereby the desired pattern of indicia is ground into the tire as the stylus traces along the pattern.

DESCRIPTION OF THE DRAWINGS

The following description of the invention will be better understood by having reference to the annexed drawing, wherein:

FIG. 1 is a perspective view of a tire and wheel rim assembly mounted on a tire engraving apparatus made in accordance with the invention;

FIG. 2 is a section of a sidewall of the tire, illustrating the rotary bit of the engraving tool used in grinding away the outer layer of rubbery material covering the underlayer of contrasting colored material;

DESCRIPTION OF THE INVENTION

Figure 3:
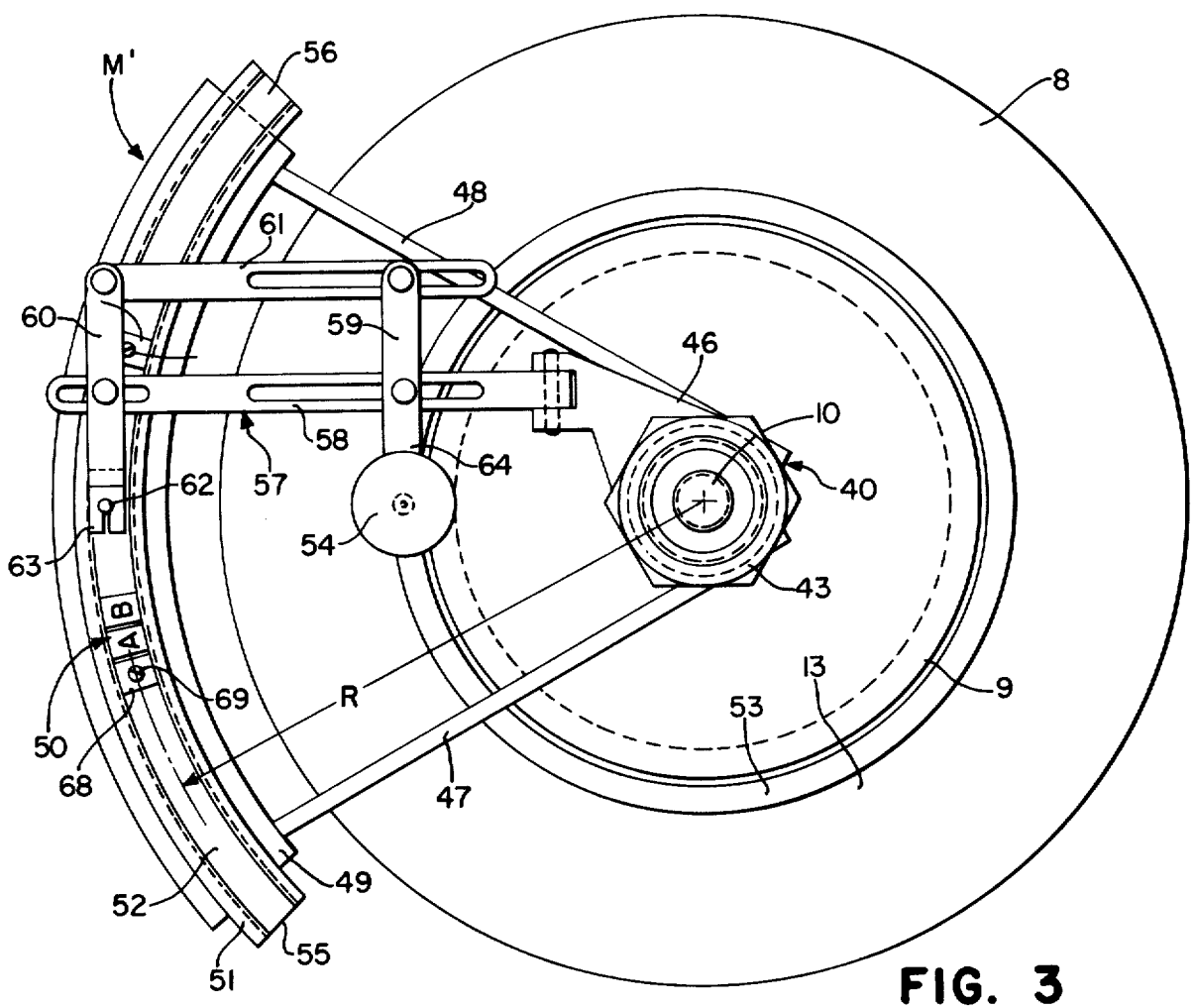
FIG. 3 is a plan view of another embodiment of the invention.

With reference to FIGS. 1 and 2 of the drawing, there is shown a conventional tire changing apparatus 6 used by local dealers and service station operators in the repair of tires. The tire changing apparatus 6 comprises a stationary frame 7 for receiving and supporting a tire 8 and wheel rim 9 on which the tire 8 is mounted and inflated. The tire 8 and wheel rim 9 are horizontally disposed on the stationary frame 7 and centered around a spindle 10 which is secured to the frame 7 in upstanding relation. A lightweight, portable mechanism M for engraving the tire 8 is detachably mounted on the spindle 10 of the tire changing apparatus 6.

The engraving mechanism or apparatus M, comprises a platform 11 for supporting a pattern 12 of indicia, e.g. letters J-O-H-N-N-Y, in angular and curved relation corresponding to that of the sidewall 13 of the tire 8 in which the indicia is being formed. The platform 11 or support for the indicia, is designed to rest on the sidewall 13 of the tire 8 in a plane which is angularly disposed to the longitudinal axis of the spindle 10. A plurality of arcuately shaped channels 14,15 are superimposed on the platform 11 in side-by-side relation, such that radii of curvature of the inner and outer arcuate, marginal edges of each of the channels 14,15 have as their common centerpoint the longitudinal axis of the spindle 10. The channels 14,15 are designed to slidably receive the pattern 12 of indicia, which in this instance, is composed of individual blocks 16-21 in which the letters J-O-H-N-N-Y are recessed. The lettered blocks 16-21 are dimensioned to fit the channels 14,15. The platform 11 is pivotally attached to a pair of support arms 22,23 which converge toward the spindle 10 where they are slidably received in a rotatable base 24 that is detachably clamped around the spindle 10 by any suitable means. A set screw 25 is used to secure each of the support arms 22,23 to the base or clamping mechanism 24, after the platform 11 has been properly located relative to the spindle 10 and adjacent sidewall 13 of the tire 8.

A pair of guide rods 26,27 are pivotally mounted in parallel relation on a collar 28 which is rotatable around the spindle 10. The guide rods 26,27 are parallel to a radially oriented line extending from the spindle 10. A support 29 for a small, router-type engraving tool 30, is slidably mounted on the guide rods 26,27 and maintains them in parallel relationship. The engraving tool 30 has a small rotary bit 31 for grinding the rubber of the sidewall 13 into fine, dust-like particles or powder which can be easily removed from the indicia being grooved into the tire. The terms "grind" and "grinding", as used in the specification and claims in connection with the formation of indicia in the sidewalls of a tire, means powdering the rubber into fine, dust-like particles or granules, as distinguished from cutting the rubber into larger slivers or pieces which are formed, for example, when conventional drills or milling type cutters are employed to cut into rubber. Such fine particles can be achieved by abrasion, grating, or cutting, depending on the size, shape and speed of the rotary bit 31 used. In any case, it is important to pulverize the rubber into very small particles which can be easily removed to prevent a build-up of heat in the rubber, since excessive heat generation causes the rubber to soften and become tacky and practically impossible to grind. It appears that for best results the surface of the bit 31 contacting the rubber, must be abrasive-like to form such small particles, as distinguished from long, smooth, cutting edges of conventional drills or milling type cutters. A small, cylindrical bit 31 of abrasive material, as manufactured by the Tunco Corporation, was used with success when rotated at a speed of 22,000 revolutions per minute (rpm). A small, conically shaped bit 31 of abrasive material, as manufactured by the Dremel Corporation, worked exceedingly well when rotated at a speed of about 24,000 rpm. The rotary speed of the bit 31 is important and speeds in excess of 20,000 rpm. should be used for best results.

A pair of connecting bars 32,33 are secured to and extend from the tool support 29 in parallel relation with the guide rods 26,27. A block 34 is slidably mounted on the connecting bars 32,33 and supports a stylus 35 which is traceable along the letters J-O-H-O-N-N-Y. Conventional set screws are used to secure the support block 34 of the stylus 35 to the connecting bars 32,33. The stylus 35 includes a biased pin (not shown) for receipt and movement in the configured recesses forming the letters J-O-H-N-N-Y. Thus, it can be appreciated that the stylus 35 and engraving tool 30 are mounted for unitary movement or movement, in unison, in radial and arcuate directions, and any combination thereof, relative to the longitudinal axis of the spindle 10.

It is desirable to maintain the pattern 12 of indicia and tool support 34 parallel to the surface of the sidewall 13 in which the indicia is being engraved. If the surface of the sidewall 13 is horizontal, i.e. at right angles to the longitudinal axis of the spindle 10, then the tracing surface of the pattern 12 of indicia, i.e. the surface of the indicia which the stylus 35 contacts as it traces the indicia, can be in planar relation. If the surface of the sidewall 13 is angularly disposed to a plane which is normal to the longitudinal axis of the spindle 10, then the pattern 12 of indicia should have a concavity from end to end such that the tracing surface of the pattern 12 of indicia is curved and dished to match the curved surface of the sidewall 13 of the tire 8; namely, the conicity of the two surfaces relative to the longitudinal axis of the spindle 10 should correspond such that the letters J-O-H-N-N-Y will be in proper arcuate alignment and ground to the same depth in the sidewall 13 of the tire 8.

Figure 4:
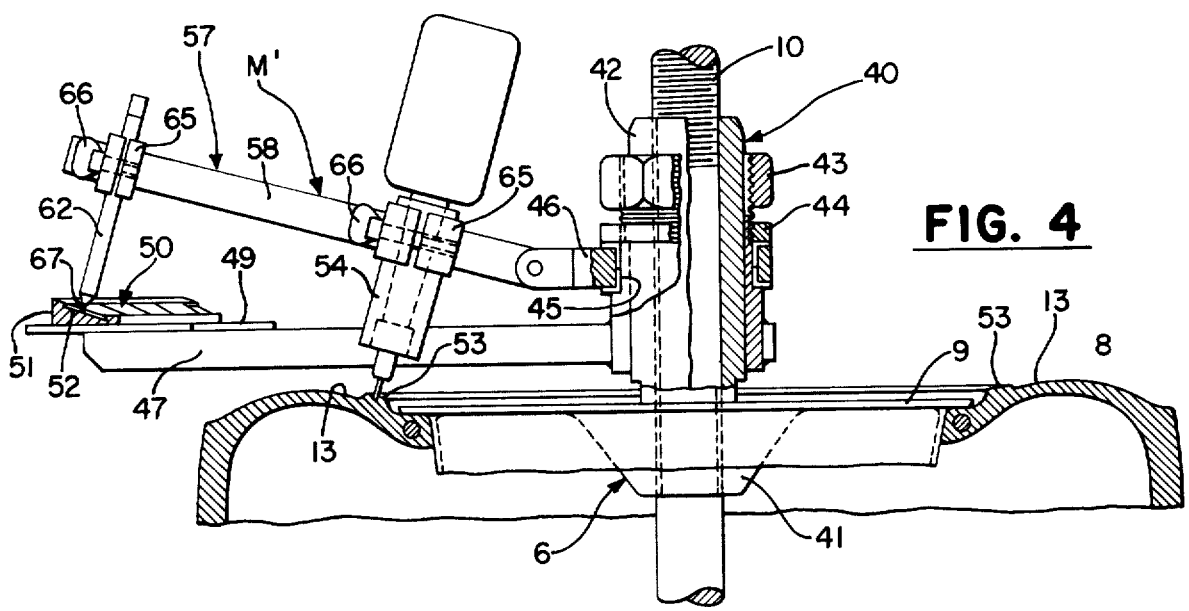
FIG. 4 is a side view of the embodiment of FIG. 3.

The mechanism M' of FIGS. 3 and 4 for engraving the tire 8 also comprises a base 40 which is centered around the spindle 10 of the tire changing apparatus 6. The base 40 is in the form of a cylinder that is designed to rest on a tapered locking nut 41, of the tire changing apparatus 6, the locking nut 41 being used to center and clamp the wheel rim 9 and tire 8 firmly against the stationary frame 7. The uppermost portion 42 of the cylindrical base 40 is threaded and made like a collet for threadably receiving a nut 43 which is used to clamp the base 40 to the spindle 10 of the tire changing apparatus 6. A locking ring 44 is threaded onto the cylindrical base 40 and helps form an annular recess 45 for receiving a collar 46 which is rotatable in the recess 45 around the longitudinal axis of the spindle 10.

A pair of rigid arms 47,48 are secured to the cylindrical base 40 and converge therefrom to support a platform 49 on which a pattern 50 of indicia, e.g. letters, is supported. A channel 51, for slidably receiving the pattern 50 of letters, is secured on the platform 49 and has a surface 52 which is sloped, i.e. declines, towards the spindle 10 to match the correspondingly sloped surface 53 of the sidewall 13 of the tire 8. The radius of curvature R of the sloped surface 52 of the channel 51 has the longitudinal axis of the spindle 10 as a centerpoint. The sloped surface 52 of the channel 51 is depressed, or concave intermediate opposing ends 55,56 of the channel 51, such that the curved surfaces 52,53 of the channel 51 and sidewall 13, respectively, especially the conicity of the surfaces 52,53 relative to the longitudinal axis of the spindle 10, match as closely as possible.

An adjustable-type pantographing linkage 57 is pivotally attached to the rotatable collar 46, such that the main link arm 58 of the linkage 57 rotates in a plane which is parallel to the longitudinal axis of the spindle 10. A pair of secondary links 59,60 angularly disposed to the main link arm 58, and another primary link 61 which generally parallels the main link arm 58, complete the pantographing linkage 57. The angular positions of the links 59–61 relative to the main link arm 58 are changeable to vary the position and movement of the engraving tool 54 relative to a stylus 62 which is clamped on the free end 63 of the radially outermost, secondary link 60, the engraving tool 54 being clamped on the free end 64 of the radially innermost, secondary link 59. Similarly designed adjustable jaws 65 with adjusting knobs 66, are used to clamp the engraving tool 54 and stylus 62 firmly in position on the pantographing linkage 57.

The stylus 62 is an elongated rod with a spring-biased tip 67 for tracing along the recessed letters or indicia. A retaining block 68 is secured to the channel 51 by an adjustable screw 69 on either side of the pattern 50 of indicia to hold individual letter blocks A-B firmly in position on the channel 51.

Figure 5:
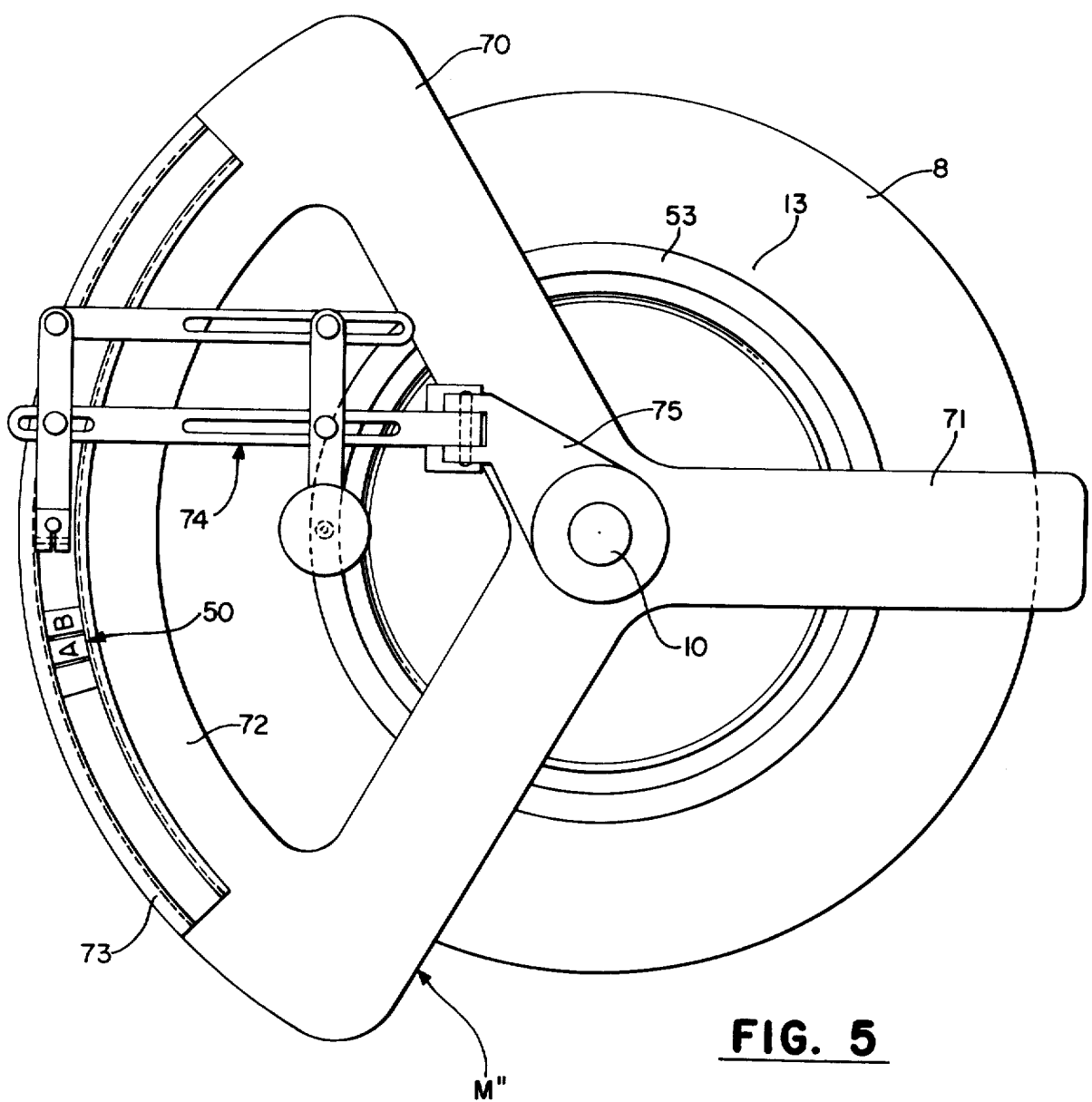
FIG. 5 is a plan view of still another embodiment of the invention.
Figure 6:
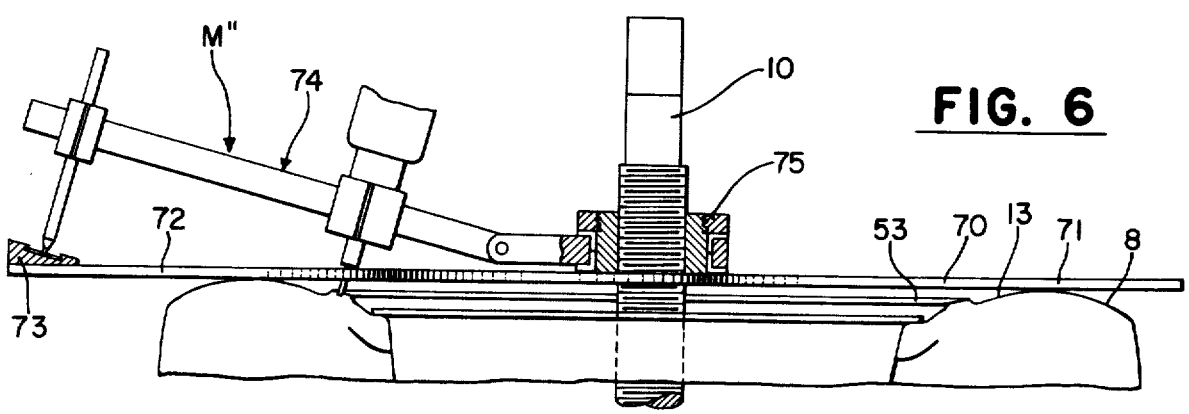
FIG. 6 is a side view of the embodiment of FIG. 5.

The mechanism M" of FIGS. 5,6 for engraving the tire 8, comprises a generally Y-shaped plate 70 having a tail portion 71 and an enclosed head portion 72 for resting on the tire 8. The enclosed head portion 72 supports a channel 73, similar to the previously described channel 51, for holding the pattern 50 of indicia. The pantographing linkage 74 is identical to the previously described linkage 57 and is also similarly pivotally connected to a collar 75 which is mounted around the spindle 10 of the tire changing apparatus 6. The collar 75 rests freely on the plate 70 and is rotatable about the spindle 10. The plate 70, because of its bulk, will generally not move and need not be clamped to the spindle 10, although this can be easily done if desired.

In operation, a tire and wheel rim are removed from an automobile and secured horizontally on the stationary frame. The desired pattern of indicia is placed in a channel which has been properly designed for the size of tire and slope of sidewall being engraved. The stylus and engraving tool are adjusted for height corresponding to the desired depth to which the indicia will be ground in the sidewall of the tire. The pantographing linkage is then adjusted for the correct size of indicia. The biased, expansible and retractible pin of the stylus is then placed within the recess of the first indicia to be reproduced in the sidewall of the tire. The electrically operated engraving tool is switched on to start grinding the indicia at least through the outer layer or cover B of black rubbery material to expose the underlying layer W of contrastingly colored, rubbery material which, in this instance, is a layer of white rubber. The names of the owners of the tires, as well as places, things, or events, whatever, can be engraved in the sidewall of the tire 6.

Thus, there has been described a lightweight, portable apparatus which can be used by local tire distributors to personalize or customize tires by placing a desired pattern of indicia on the outer exposed sidewalls of the tire. Generally, the exposed indicia will be white in contrast to the black of the tire, although differently colored indicia can be used, providing corresponding portions of the underlayer of rubbery material are similarly colored.

I claim:
1. An apparatus used in the formation of indicia in the sidewall of a tire having a center axis, comprising:
   a. means for supporting a tire and wheel rim on which the tire is mounted; to be formed in a sidewall of the tire mounted on the wheel rim, the indicia of the pattern having a traceable surface;
   c. means, coacting with the tire and wheel rim supporting means, for mounting the pattern of indicia such that the indicia of the pattern are equally spaced from the center axis of the tire and wheel rim and the traceable surface of the indicia corresponds to the curved, outer surface of the sidewall receiving the indicia;
   d. a stylus for tracing the indicia of the pattern;
   e. a tool for grinding the indicia in the sidewall; and
   f. means, coacting with said tire and wheel rim supporting means, for mounting the stylus and grinding tool for unitary corresponding radial and arcuate movement and any combination thereof, relative to the center axis of the tire and wheel rim.

2. The apparatus of claim 1, wherein the pattern mounting means includes:
   g. means for mounting the pattern of indicia in a curvilinear plane corresponding to the curved outer surface of the sidewall in which the indicia is being formed.

3. The apparatus of claim 1, wherein the pattern mounting means includes:
   h. a spindle coincidental with the center axis of the tire and wheel rim;
   i. means for supporting the pattern of indicia including a curved surface against which the pattern of indicia rests; and
   j. means for detachably mounting the pattern of indicia on the surface of the support means.

4. The apparatus of claim 3, wherein the means (i) and (j) for supporting and mounting the pattern of indicia includes:
   k. at least one channel for slidably receiving the pattern of indicia; and
   l. means for holding the pattern of indicia in the channel.

5. The apparatus of claim 4, wherein the pattern of indicia includes at least one block in which the indicia is recessed for receiving the stylus.

6. The apparatus of claim 4, wherein the means for mounting the stylus and engraving tool for unitary movement, comprises:
   m. a pair of guide rods rotatably mounted on the spindle, the guide rods being parallel to an imaginary line extending radially from the spindle;
   n. means for supporting the tool such that the engraving portion of the tool extends into the sidewall of the tire a predetermined distance beyond black rubbery material of the sidewall into a layer of rubbery material which is colored differently from the black rubbery material;
   o. means for slidably mounting the tool support on the guide rods; and
   p. means for coupling the stylus and tool support together.

7. The apparatus of claim 6, wherein the means for coupling the stylus and tool support together, includes a connecting bar secured to the tool support and extending therefrom in parallel relation to the guide rods, and means for clamping the stylus on the free end of the connecting bar extending from the tool support.

8. The apparatus of claim 7, wherein the grinding portion of the tool includes an abrasive bit which rotates about an axis which is perpendicular to the sidewall surface being ground.

9. The apparatus of claim 1, wherein the means for mounting the pattern of indicia, includes:
   a. a support for holding the indicia, including a rigid surface corresponding to the surface of the sidewall in which the pattern of indicia is ground, the pattern of indicia resting against the surface; and
   b. means for detachably mounting the pattern of indicia on the support.

10. The apparatus of claim 9, wherein the support for holding the indicia and the means for detachably mounting the pattern of indicia on the support, include at least one channel with said surface for slidably receiving the pattern of indicia, and means for maintaining the pattern of indicia firmly against said surface within said channel.

11. The apparatus of claim 10, wherein the mounting means for the stylus and grinding tool includes a pantographing linkage for coupling the stylus and grinding tool together, and means for pivotally mounting the pantographing linkage for rotation to and from the support for the tire and wheel rim.

12. The apparatus of claim 11, which includes means for changing the position of the links of the pantographing linkage relative to each other to correspondingly adjust the position or movement of the grinding tool relative to the stylus.

13. The apparatus of claim 12, wherein the grinding tool includes an abrasive bit which rotates about an axis that is perpendicular to the sidewall surface being ground.

14. The apparatus of claim 13, wherein the support for the pattern of indicia includes a platform for carrying the channel, the platform being designed to rest on the tire, and means for detachably mounting the platform on a spindle which extends from the support for the tire and wheel rim and has a longitudinal axis that coincides with the center axis of the tire and wheel rim.

15. The apparatus of claim 14, which includes a collar, rotatable around the longitudinal axis of the spindle, to which the pantographing linkage is pivotally connected.

16. The apparatus of claim 1, wherein the grinding tool includes a bit of abrasive material carried by the grinding tool, and means for mounting the bit for rotation at speeds in excess of 20,000 revolutions per minute and about an axis which is generally perpendicular to the surface of the sidewall receiving the indicia.

17. A method of engraving indicia in the sidewall of a tire having an outer layer of rubbery material covering an underlying layer of contrastingly colored rubbery material, comprising:
   a. supporting a tire, mounted on a wheel rim and inflated, in a horizontal plane, the tire and wheel rim having a center axis;
   b. mounting a pattern of indicia above the horizontally disposed tire such that the individual indicia of the pattern are equally spaced from the center axis of the tire and wheel rim;
   c. tracing a stylus along the individual indicia of the pattern, the stylus being coupled for unitary movement to a small diameter, abrasive bit which is rotatable for grinding indicia in the surface of a sidewall of a tire and about an axis that is substantially perpendicular to said sidewall surface; and d. grinding the indicia through the outer layer into the inner layer in accordance with the pattern of indicia.

18. The method of claim 17, wherein each of the indicia is recessed in a block containing the indicia.

19. The method of claim 17, which includes rotating the bit at speeds in excess of 20,000 revolutions per minute.

20. The method of claim 19, which includes rotating the bit at about 24,000 revolutions per minute.

* * * * *